US008098649B2

(12) United States Patent
Regan et al.

(10) Patent No.: US 8,098,649 B2
(45) Date of Patent: Jan. 17, 2012

(54) USING NETWORK TRANSPORT TUNNELS TO PROVIDE SERVICE-BASED DATA TRANSPORT

(75) Inventors: Joe Regan, Pleasanton, CA (US); Sunil Khankekar, San Jose, CA (US); Marcelo Mourier, Menlo Park, CA (US)

(73) Assignee: Alcatel Lucent, Paris (FR)

( * ) Notice: Subject to any disclaimer, the term of this patent is extended or adjusted under 35 U.S.C. 154(b) by 1606 days.

(21) Appl. No.: 10/833,489

(22) Filed: Apr. 27, 2004

(65) Prior Publication Data

US 2005/0013295 A1 Jan. 20, 2005

Related U.S. Application Data

(60) Provisional application No. 60/466,340, filed on Apr. 28, 2003.

(51) Int. Cl.
*H04L 12/28* (2006.01)
(52) U.S. Cl. ........................................ 370/351; 370/392
(58) Field of Classification Search .................. 370/389, 370/248, 401, 228, 355, 395.5, 219
See application file for complete search history.

(56) References Cited

U.S. PATENT DOCUMENTS

| 7,139,276 B1* | 11/2006 | Sitaraman et al. | 370/401 |
|---|---|---|---|
| 7,269,135 B2* | 9/2007 | Frick et al. | 370/228 |
| 7,477,657 B1* | 1/2009 | Murphy et al. | 370/468 |
| 2002/0116501 A1 | 8/2002 | Ho et al. | |
| 2002/0145981 A1* | 10/2002 | Klinker et al. | 370/244 |
| 2002/0176414 A1* | 11/2002 | Miki et al. | 370/389 |
| 2003/0028650 A1 | 2/2003 | Chen et al. | |
| 2003/0115480 A1* | 6/2003 | McDysan | 713/201 |
| 2003/0185217 A1* | 10/2003 | Ganti et al. | 370/395.5 |
| 2004/0165600 A1* | 8/2004 | Lee | 370/395.53 |

FOREIGN PATENT DOCUMENTS

EP 1202501 5/2002

* cited by examiner

*Primary Examiner* — Chirag Shah
*Assistant Examiner* — Jenkey Van
(74) *Attorney, Agent, or Firm* — Van Pelt, Yi & James LLP

(57) ABSTRACT

Service-based distribution paths that provide transport tunnels and control capabilities for data communication over a service are disclosed. Service-based distribution paths or transport tunnels include services mapped or bound to the transport tunnel. Encapsulation provides for packet-by-packet handling, including service separation of packets based on header data included within each packet. Services may be monitored, managed, and controlled by performing operational determinations between end points to ensure end-to-end service configuration and connectivity are established.

29 Claims, 11 Drawing Sheets

200

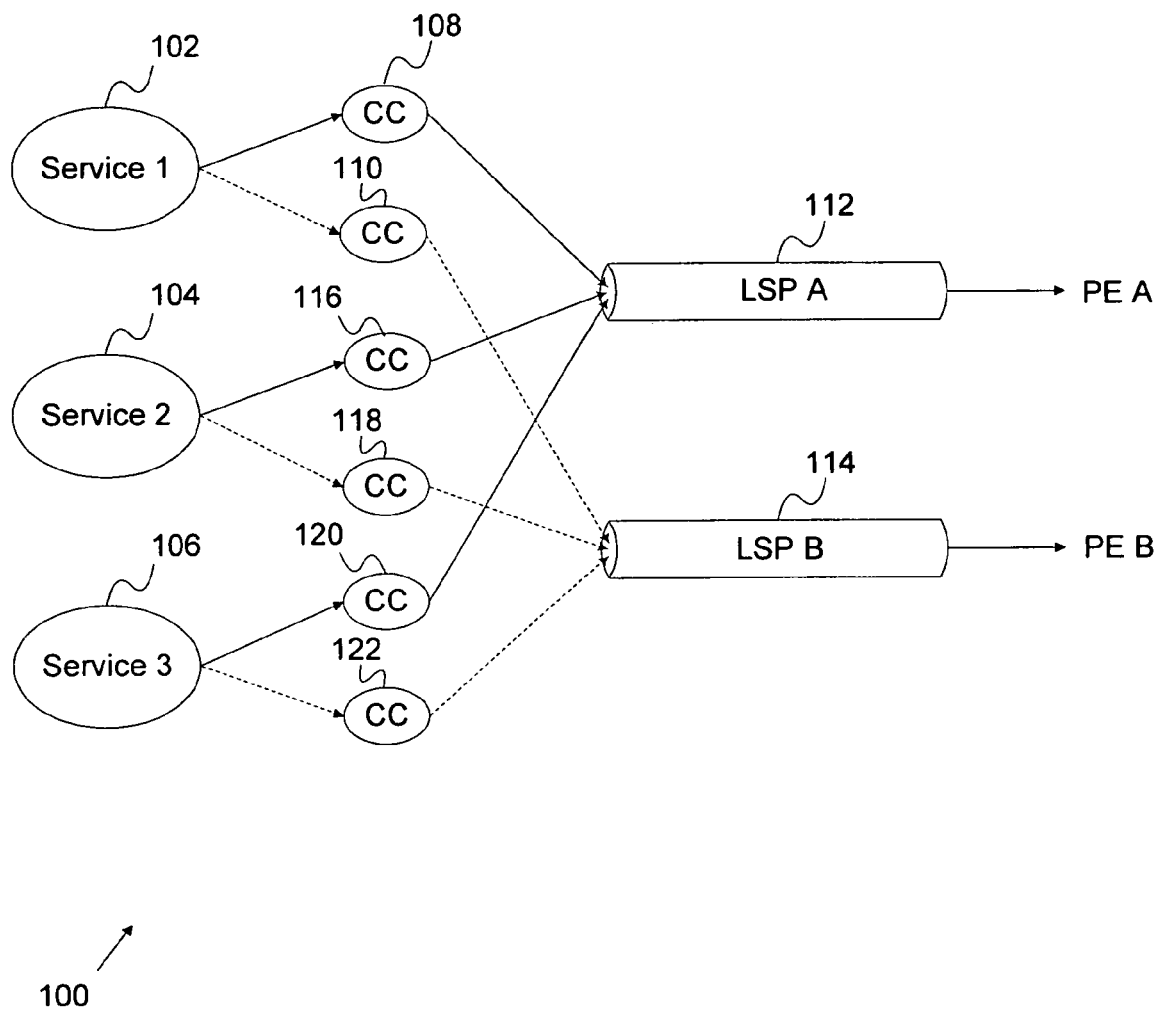
FIG. 1 - Prior Art

USING NETWORK TRANSPORT TUNNELS TO PROVIDE SERVICE-BASED DATA TRANSPORT

CROSS REFERENCE TO RELATED APPLICATIONS

This application claims priority to U.S. Provisional Patent Application No. 60/466,340 entitled "Using Network Transport Tunnels to Provide a Service-Based Distribution Path" filed Apr. 28, 2003 which is incorporated herein by reference for all purposes.

This application is related to U.S. Patent Application No. 10/833,823 entitled "OAM Echo-Based Message to Verify a Service-Based Network Distribution Path" filed concurrently herewith, which claims priority to U.S. Provisional Patent Application No. 60/466,248 filed on Apr. 28, 2003, entitled "Echo Messaging To Verify Service-Based Network Distribution Path," both of which are incorporated herein by reference for all purposes.

FIELD OF THE INVENTION

The present invention relates generally to computer networks. More specifically, using network transport tunnels to provide service-based data transport is disclosed.

BACKGROUND OF THE INVENTION

Transport tunnels are employed in communications, networks, and networking equipment (e.g., routers, switches, hubs, etc.) to route data between endpoints. In some instances, transport tunnels may be used to forward packets through a network that does not support the particular packet protocol in use. For example, a transport tunnel may be used to forward a non-UP packet across an IP network, multicast packets across a unicast network, etc.

Services may be bound to a transport tunnel, but use a cross-connect or binding that is individually connected between a service and a transport tunnel. In order to modify the service or tunnel that is transporting packets for the service, each individual service and cross connect must be individually modified. This limits the ability of networks to efficiently implement and operate services across core networks, leading to significant time and expense in both managing the transport tunnels as well as the services that connect to them. Further, it inhibits the implementation for networks where a service vendor may be providing numerous services across a multitude of core networks or transport tunnels.

Thus, a solution is needed that enables capabilities for providing service-based data communication using transport tunnels that does not require that each individual service be reconfigured every time a transport tunnel is added, changed, or removed and that allows services to be added, changed, or removed without requiring that those provisioning such services have detailed information about the transport tunnels and how the tunnels are configured.

BRIEF DESCRIPTION OF THE DRAWINGS

Various embodiments of the invention are disclosed in the following detailed description and the accompanying drawings.

FIG. 1 illustrates an exemplary system for binding services to label switched paths;

DETAILED DESCRIPTION

Figure 2A:
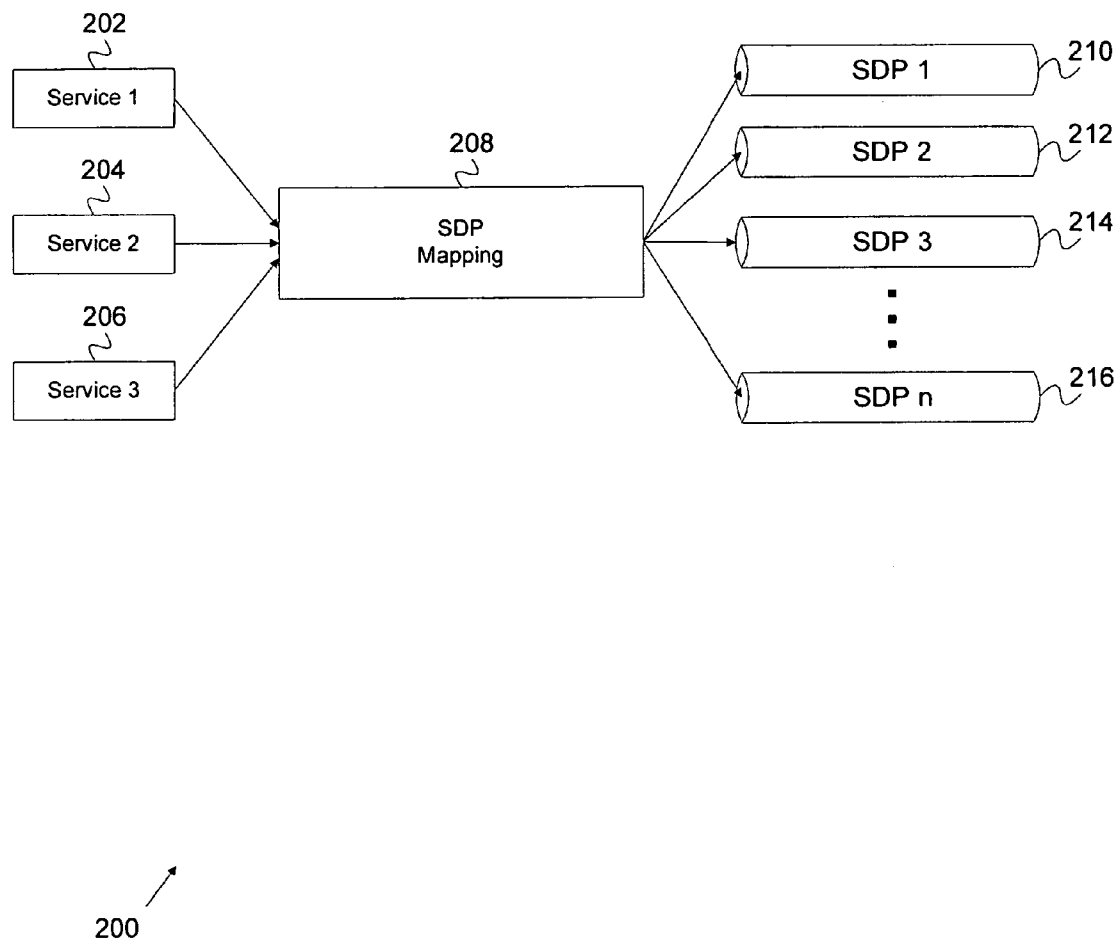
FIG. 2A illustrates an exemplary system for using transport tunnels bound to service-based distribution paths.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data communication across one or more networks may require multiple protocols or techniques for forwarding packets between endpoints such as network connected edge routers. Using a service-based distribution point (SDP) to transport data between endpoints such as provider edge routers (PEs) or other label edge routers (LERs) for subsequent delivery to downstream customer edge routers (CE) and end destinations (e.g., MAC addresses) is disclosed. The transport tunnels associated with SDPs may be established using protocols such as MPLS, MPLS-Traffic Engineering (MPLS-TE), IP, or other types of generic routing (e.g., GRE) protocols. SDPs may comprise transport tunnels between endpoints to provide a transport tunnel for service packet transmission. In the case of MPLS, label-switched paths (LSPs) may be associated (as individual paths or sub-paths)

with SDPs. A service or set of services may be mapped or bound to one or more SDPs. Packets associated with a service may be transported via a transport tunnel associated with an SDP to which the service is bound. Regardless of the core network protocol in use, an SDP enables improved service control, monitoring, configuration, and other capabilities.

FIG. 1 illustrates a system for binding services directly to individual label switched paths. Services 102-106 send data to provider edge (PE) router A via LSP A 112 using cross connects (CC) 108, 116, and 120, respectively. Service 102-106 send data to PE router B via LSP B 114 using cross connects 110, 118, and 122, respectively. Each service 102-106 is individually configured with an independent cross connect for each LSP. Fewer or more cross connects and services may be implemented, but where multiple services are employed, management, monitoring, and control may become increasingly complicated. For example, a change to LSP 112 would require that each of cross connects 108, 116, and 120 be reconfigured to reflect the change. In the simplified example shown in FIG. 1, only three services (and/or their associated cross connects) would have to be reconfigured. However, in a typical commercial embodiment, there may be thousands of services and dozens or more LSPs. In addition, the individuals provisioning the services 102-106 would have to know certain information about the LSPs 112 and 114 in order to be able to bind the services directly to the LSPs by correctly configuring the cross connects, which requires that the persons who configure the services have knowledge about the transport paths (LSPs) that they otherwise would not need to have, thereby potentially increasing training, recruitment, salary, and other costs.

FIG. 2A illustrates an exemplary system 200 in which transport tunnels bound to service-based distribution points (SDPs) are used to provide service-based transport of network traffic. Services 1-3, labeled 202-206, in FIG. 2A, are bound by SDP mapping module 208 to one or more of SDPs 210-216. While the SDP mapping module 208 is shown as a single box in FIG. 2A, in some embodiments it may be implemented as a set of individual cross-connects binding each service to one or more of SDPs 210-216. SDPs 210-216 may be implemented having one or more transport tunnels (e.g., LSPs) associated with each SDP. The transport tunnels may be static or dynamic. In one embodiment, each SDP comprises a distribution point for a single destination (egress) PE router. Each SDP may have multiple services bound or mapped to it by the SDP mapping module 208. In one embodiment, an ingress PE router may have more than one SDP associated with the same destination (egress) PE, but each service may be bound or mapped only to one SDP for each destination to which the service may be configured to send data. LSPs are one example of a type of transport tunnel that may be associated with an SDP for transporting service packets across an MPLS core network. With other types of core networks or networks that may use different core routing protocols, other types of paths may be used. Regardless of the core network protocol, each SDP 210-216 may be treated as a distribution point having one or more associated transport tunnels that connect a near-endpoint with a far-endpoint/destination, to which one or more services may be mapped in order to enable the service(s) to send service packets (or service data in some other form) to the destination associated with the SDP. By binding the services 202-206 to the SDPs, instead of binding the services directly to the transport tunnels (e.g., LSPs) as in FIG. 1, the services 202-206 can be configured independently of the transport tunnels, and vice versa, thereby simplifying the provisioning and/or reconfiguration of each. For example, if an LSP in SDP 1 (210) were added, removed, or changed, the information about the LSP would only have to be modified once, in the SDP. The services 202-206, which are in the system 200 bound by the SDP mapping module 208 to the SDP and not directly to the transport tunnels associated with the SDP, would not require any change. Similarly, services could be added, removed, or changed without requiring that multiple cross connects to a plurality of LSPs (or other transport paths) be modified.

In one embodiment, an SDP has several attributes for providing service-based data communication capabilities. Examples of these attributes include an address (e.g., IP address) for a far-end destination (e.g., PE or other egress equipment or node) that represents an endpoint to which network traffic associated with the service may be sent for further delivery to a customer destination associated with the service, the type of encapsulation used to transport data to the destination (e.g., GRE, MPLS, L2TP, etc.), a path used to reach a far-end destination (where applicable, e.g., MPLS), and the maximum transmission unit (MTU) for the path. An SDP provides control capabilities using these attributes that determine how service packets (i.e., packets transported to implement a specific service such as a virtual leased line (VLL) or other type of service provided by a vendor or service provider, etc.) are transported and handled on an end-to-end basis throughout the network. An SDP may be used to transport packets associated with a single service or multiple services. By grouping multiple LSPs or paths into a single transport tunnel (SDP), services packets may be load shared among the LSPs comprising the SDP. That is, packets may be distributed among several paths for routing to an end service destination, instead of sending packets for a particular service across a single path. A protocol may also be used for dynamically monitoring the end-to-end operational state of an SDP, providing the capability to determine whether the operational state of an SDP has changed and, if so, what services may be affected. As an example, a "keep alive" protocol may be implemented that provides for specific header values or information that, upon de-multiplexing, may be used for operation, administrative, and maintenance (OAM) functions.

Figure 2B:
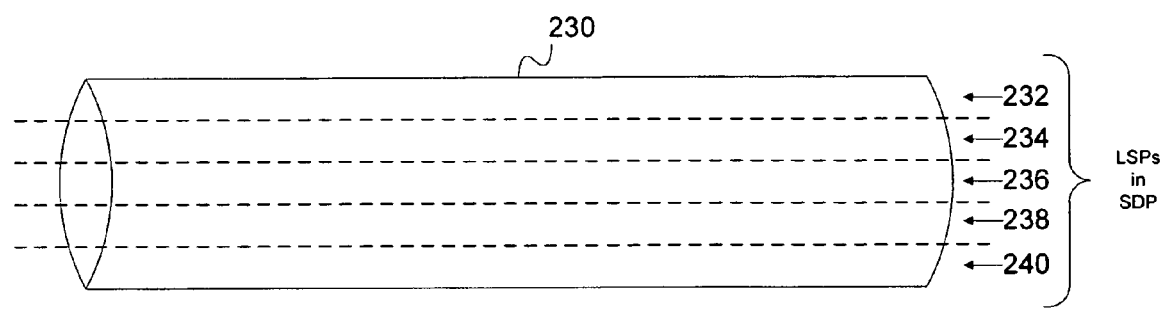
FIG. 2B illustrates an exemplary service-based distribution path including associated transport tunnels.

FIG. 2B illustrates an exemplary service-based distribution point including associated transport tunnels. SDP 230 is shown having several LSPs 232-240 (assuming MPLS is in use) associated with it. In other examples where MPLS may not be in use, transport tunnels other than LSPs may be used. For purposes of illustration where MPLS or MPLS-TE are used, LSPs 232-240 transport service packets between a near-end (ingress) router and one or more far-end (egress) routers associated with the SDP. In FIGS. 2A and 2B, SDPs are represented graphically as tunnels comprising one or more component transport tunnels, such as LSPs, to convey the concept that SDPs provide a way to transport data, via the transport tunnels associated with them, to a destination associated with the SDP. It should be understood that the SDPs do not in fact represent transport mechanisms separate from or layered on top of the transport tunnels associated with them, and instead serve as a distribution point configured to cause data packets associated with services bound to the SDP to be transported to a destination associated with the SDP via a transport tunnel (e.g., LSP) associated with the SDP. Establishment and configuration of an SDP will be described in greater detail below in connection with FIGS. 3 through 9.

Figure 3:
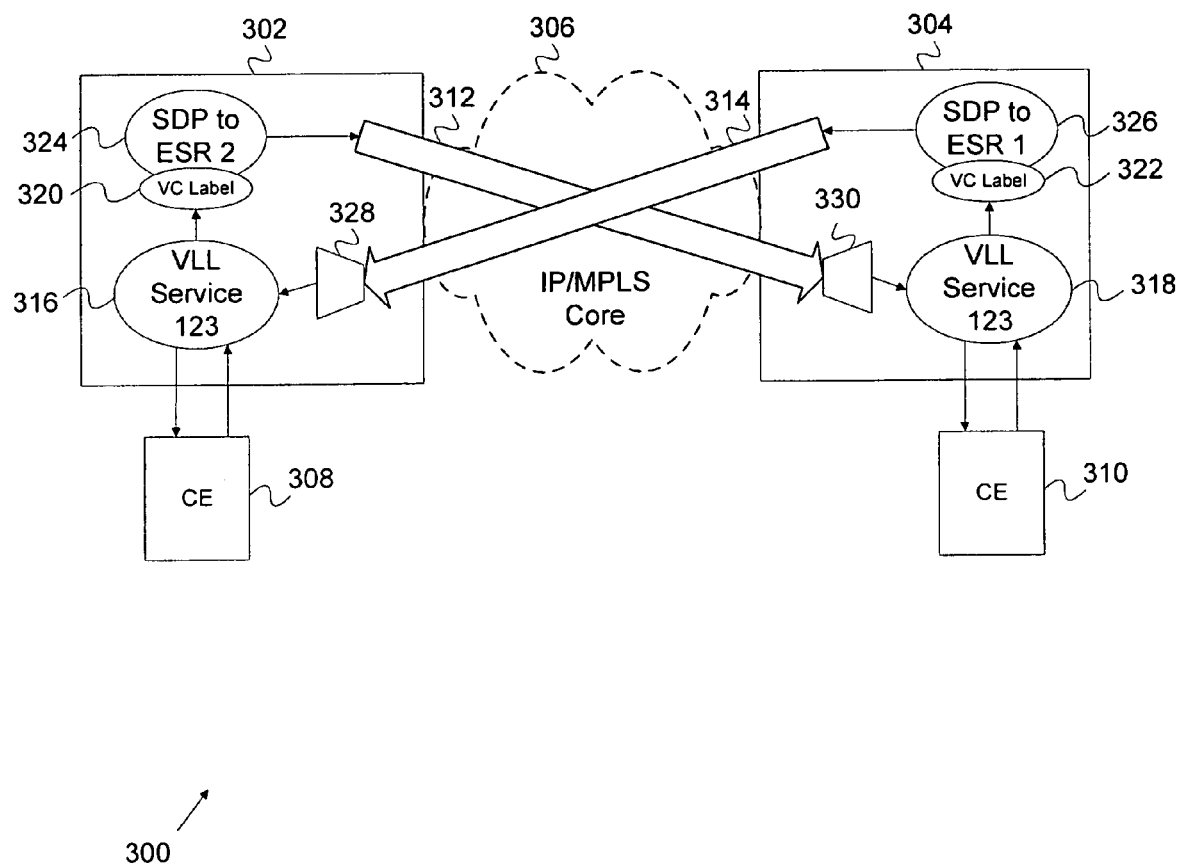
FIG. 3 illustrates an exemplary system having unidirectional transport tunnels interconnecting endpoints across a network.

FIG. 3 illustrates an exemplary system 300 having unidirectional transport tunnels interconnecting endpoints across a network. This illustration shows a more detailed example of a system where SDPs may be used to provide service-based transport of data across a network or series of networks. Edge service routers (ESRs) 302 and 304 are connected across network 306. In this example, network 306 is illustrated as being an IP/MPLS core network. In other embodiments, other types of core network may be used. CEs 308-310 send packets received from ESRs 302 and 304, respectively, to the final customer destinations to which they are addressed, such as MAC addresses within their respective customer networks. CEs 308 and 310 also received from associated customer nodes packets to be transported using VLL Service 123 and deliver such packets to ESRs 302 and 304, respectively, for transport. Unidirectional transport tunnels 312 and 314 provide the transport mechanism for service packet transmission and are associated with the SDPs illustrated in this example. In one embodiment, transport tunnel 312 comprises an LSP associated with SDP 324 and transport tunnel 314 comprises an LSP associated with SDP 326. Here, a service such as VLL may be implemented using bidirectional service access points 316-318. In other embodiments, other types of service, e.g., VPLS, may be provided. Service packets are exchanged between service access points 316-318 and transported over unidirectional transport tunnels 312 and 314. In this example, virtual circuit (VC) labels 320 and 322 are applied to the service packets originating from service access points 316 and 318, respectively. SDPs 324-326 forward the service packets with the appended VC labels 320-322 across unidirectional transport tunnels 312 and 314 to ESRs 302-304. Upon receipt of the service packets with the prepended VC labels, de-multiplexers 328 and 330 identify the service packets as destined for service access points 316 or 318, based on VC labels 320-322, and route them accordingly.

In the example shown in FIG. 3, a customer packet associated with VLL Service 123 that is sent by a source associated with CE 308 to a destination associated with CE 310, for example, would be sent by CE 308 to ESR 302. ESR 302 would receive the packet and associate the packet with VLL Service 123 (e.g., based on the port on which it was received, encapsulation used, a label or other identifying information included in the packet, etc.). The service access point 316 forwards the packet to SDP 324 (either directly in the embodiment shown or via an SDP mapping module, not shown in FIG. 3 but described above in connection with FIG. 2A, e.g., in an embodiment in which multiple services may use the same SDP) for transport to egress ESR 304. The SDP 324 encapsulates the packet for transport to ESR 304 via unidirectional transport tunnel 312, including by appending a VC label 320 that identifies the packet as being associated with Service 123. In an embodiment in which SDP 324 comprises two or more transport tunnels to ESR 304, SDP 324 selects a tunnel to be used to transport the packet to ESR 304. For example, in an embodiment in which the SDP 324 comprises two or more LSPs, the SDP 324 may be configured to bind a service to a particular LSP, e.g., a VLL service such as VLL Service 123, so that all traffic for the service is sent via the same LSP. For other types of service (e.g., VPLS or VPRN), the SDP may map packets to an LSP for transport by associating the packet with a "conversation" (i.e., a related set of packets being exchanged between two endpoints) and select an LSP associated with that conversation (e.g., to prevent packets from being delivered out of order, as might happen if different packets associated with a conversation were sent via different paths.) In some embodiments in which VPLS, VPRN, or similar service is being provided, the destination MAC address may be used to identify the LSP to be used to transport the packet. When the packet arrives at ESR 304, demultiplexer 330 identifies the packet as being as associated with Service 123, e.g., based on the presence of VC label 320, and delivers the original (payload) packet to service access point 318 for processing. Service access point 318 then delivers the packet to CE 310.

Figure 4:
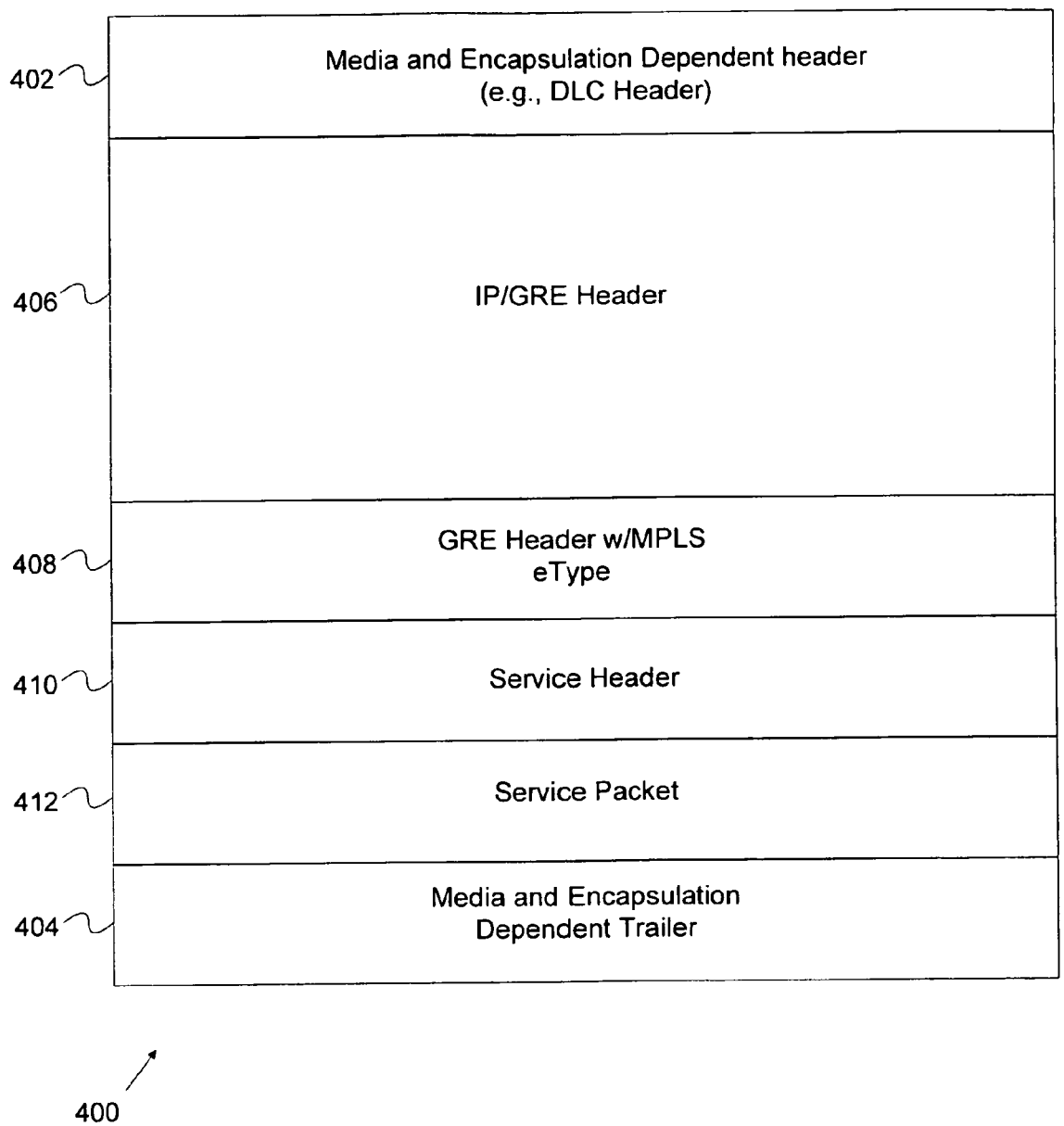
FIG. 4 illustrates an exemplary service packet format for a service-based distribution path data.

FIG. 4 illustrates an exemplary service packet format for service-based transport. The following packet format is an example of a type of service packet that may used to implement SDPs. Alternative formats may be used and are not limited to the illustrated embodiment. In the example shown, IP/GRE encapsulation of an MPLS packet is used to transport packets through the core network. Here, service packet 400 includes several components 402-412. Encapsulated service packet 400 comprises a media and encapsulation dependent header 402 for specifying handling of service packet 400 within the core network. If necessary, a media and encapsulation dependent trailer 404 may also be appended to service packet 400. In other embodiments, media and encapsulation dependent trailer 404 may not be used. Additional headers are also included to enable the separation and handling of service packet 400.

In this embodiment, service packet 400 may be transported through an IP core network. An IP/generic routing encapsulation (GRE) header 406 may be used for transporting service packet 400 over an IP-based network. In one embodiment, IP/GRE header 406 comprises an IP header in which the GRE protocol is specified. GRE Header 408 is added to provide generic routing encapsulation for forwarding service packet 400. In one embodiment, GRE header 408 indicates MPLS as the protocol type of the IP/GRE encapsulated packet. IP/GRE header 406 and GRE header 408 are used to transmit service packet 400 between edge service routers (e.g., provider edge devices configured to provide service-based transport services as described herein). Service header 410 may also be used to identify the specific service that service packet 400 is intended to use. A specific service may be identified using a VC label or other type of label. In one embodiment, Martini encapsulation is used. Service packet data 412 constitutes the payload or portion of data intended to be delivered via the service. In other embodiments, other protocols and/or packet formats may be used.

Figure 5:
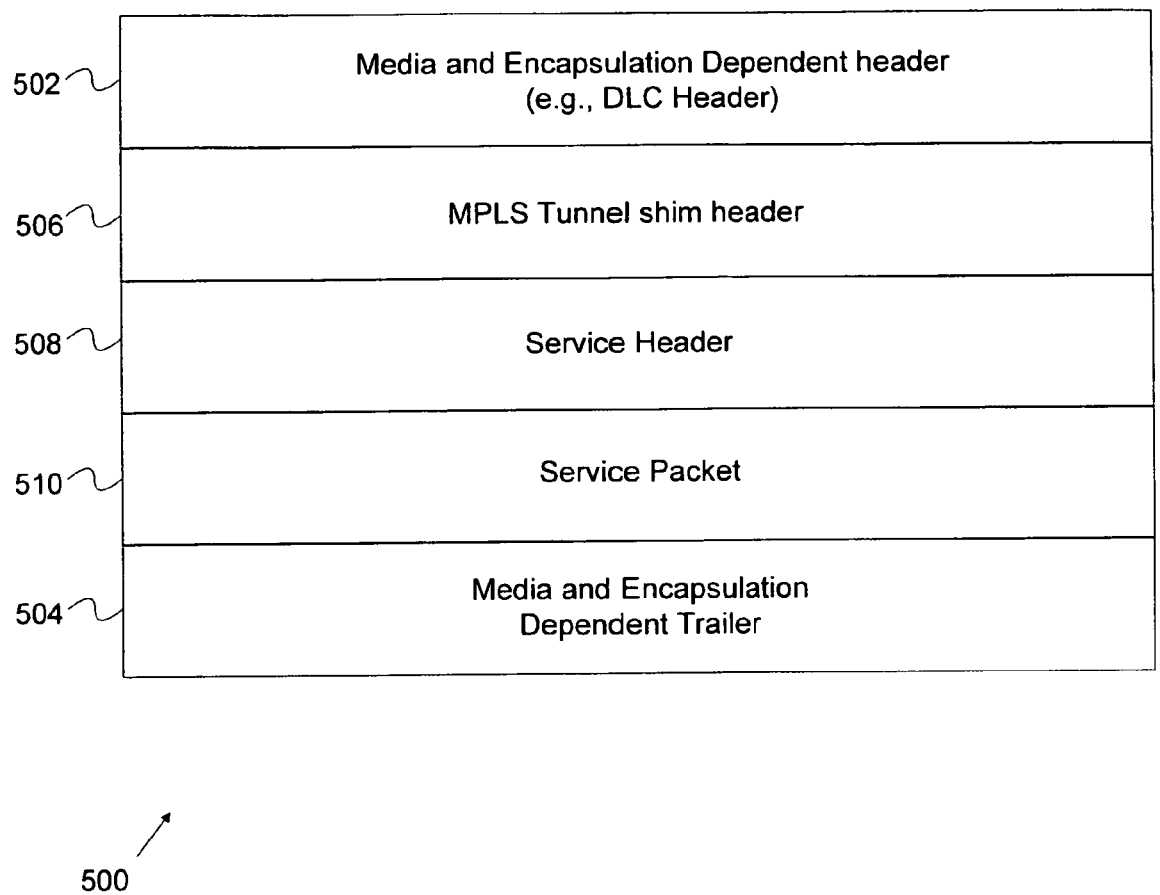
FIG. 5 illustrates a service packet format for a service-based distribution path, in accordance with an alternative embodiment.

FIG. 5 illustrates a service packet format for service-based distribution, in accordance with an alternative embodiment. In the embodiment shown in FIG. 5, MPLS encapsulation is used to transport packets through the core network. Service packet 500 includes media and encapsulation dependent header 502 and, if necessary, media and encapsulation dependent trailer 504. With an MPLS core network, MPLS tunnel shim header 506 provides forwarding and handling information to routers and nodes within the MPLS core. Service header 508 identifies service packet 500 for a particular service. VC labels and service identification labels may be included within service header 508. Finally, service packet data 510 provides the payload or primary data being transported between end destinations implementing a service.

FIGS. 4 and 5 illustrate examples of types of encapsulation techniques that may be used to transport packets between SERs. Regardless of the type of encapsulation used by an SPD for tunneling purposes (i.e., establishing a transport tunnel/SDP for a service), each service within a tunnel may be uniquely identified using a service identification label (e.g., Service ID) or other form of label. A service encapsulation within a tunnel provides service separation and capabilities to infer service handling on a packet-by-packet basis. In one example, Martini encapsulation may be used to provide a common encapsulation method for both IP/GRE and MPLS SDPs, as illustrated in FIGS. 4 and 5. A Martini-encapsulated service header may be implemented as an additional label in an MPLS shim header. In other embodiments other forms of encapsulation besides Martini encapsulation may be used.

Figure 6:
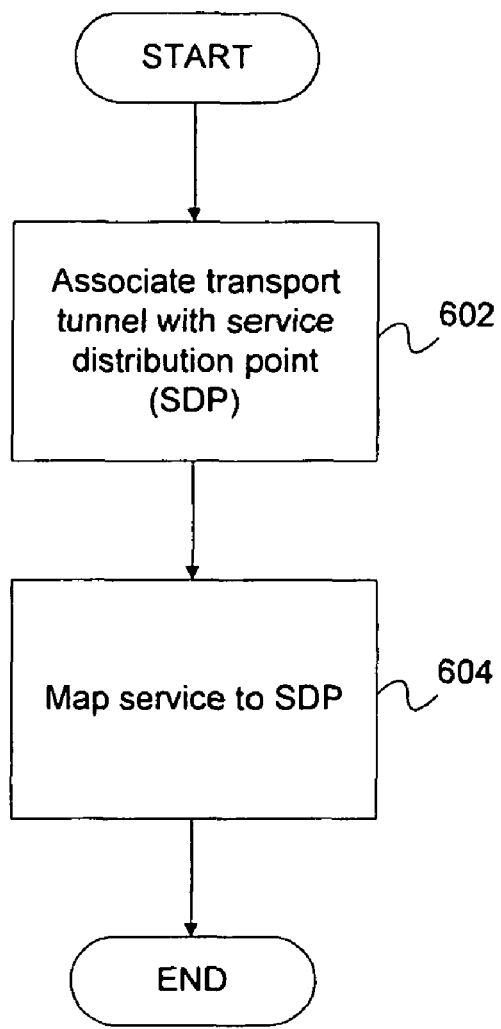
FIG. 6 illustrates an exemplary overall process for using a service-based distribution path.

FIG. 6 illustrates an exemplary overall process for establishing a service-based distribution point. The process shown is an example of an overall process for implementing an SDP and binding a service to it. A transport tunnel (e.g., LSP) is associated with the SDP (602). As noted above, in some embodiments, one or more transport tunnels may be associated with an SDP. The transport tunnel associated with the SDP must have as its far end destination the destination (egress) PE router (or other node or equipment) associated with the SDP. A service is associated with the SDP (604). Once a transport tunnel has been associated with the SDP and a service bound to the SDP, packets associated with the service may be sent via the transport tunnel to the destination associated with the SDP.

Figure 7A:
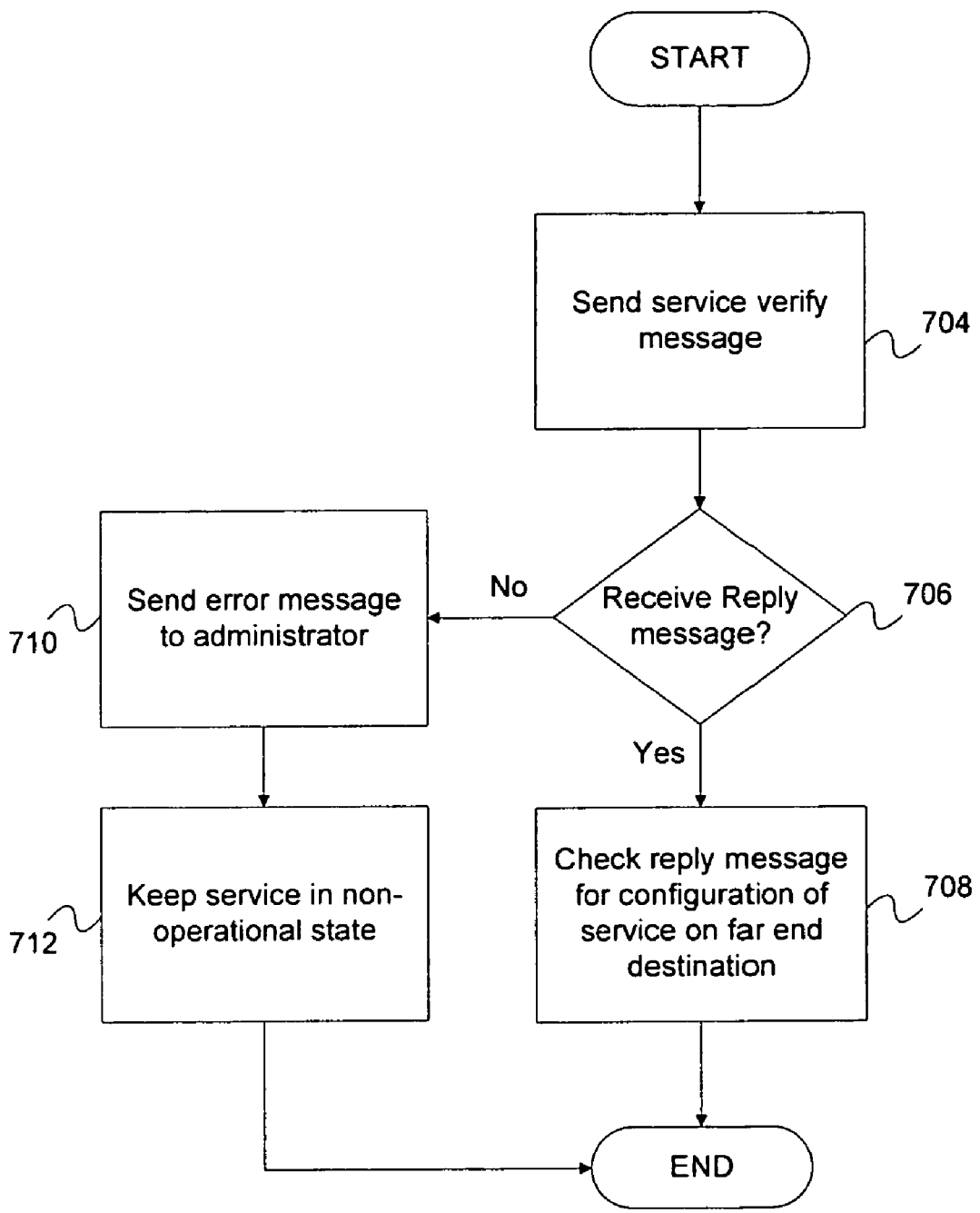
FIG. 7A illustrates a process for operational service determination, in accordance with an embodiment.

FIG. 7A illustrates a process for operational service determination, in accordance with an embodiment. Operational service determination may include checking configuration, testing connectivity, dynamic monitoring of the end-to-end operational state of an SDP, troubleshoot an inoperable SDP, or round trip testing. In this embodiment, OAM messaging may be used to implement operational service determination. A service verify message is sent to the far-end ESR to verify that the desired service is available, properly configured, operational, and connectivity (e.g., MTU) is determined (704). It is determined whether a reply message is received (706). If a reply message is received, then the reply message is checked for data or information about the configuration of the far-end ESR with respect to the service being verified (708). If a reply message is not received, then an error message is sent to an administrator (710) and the service is kept in a non-operational state (712).

Figure 7B:
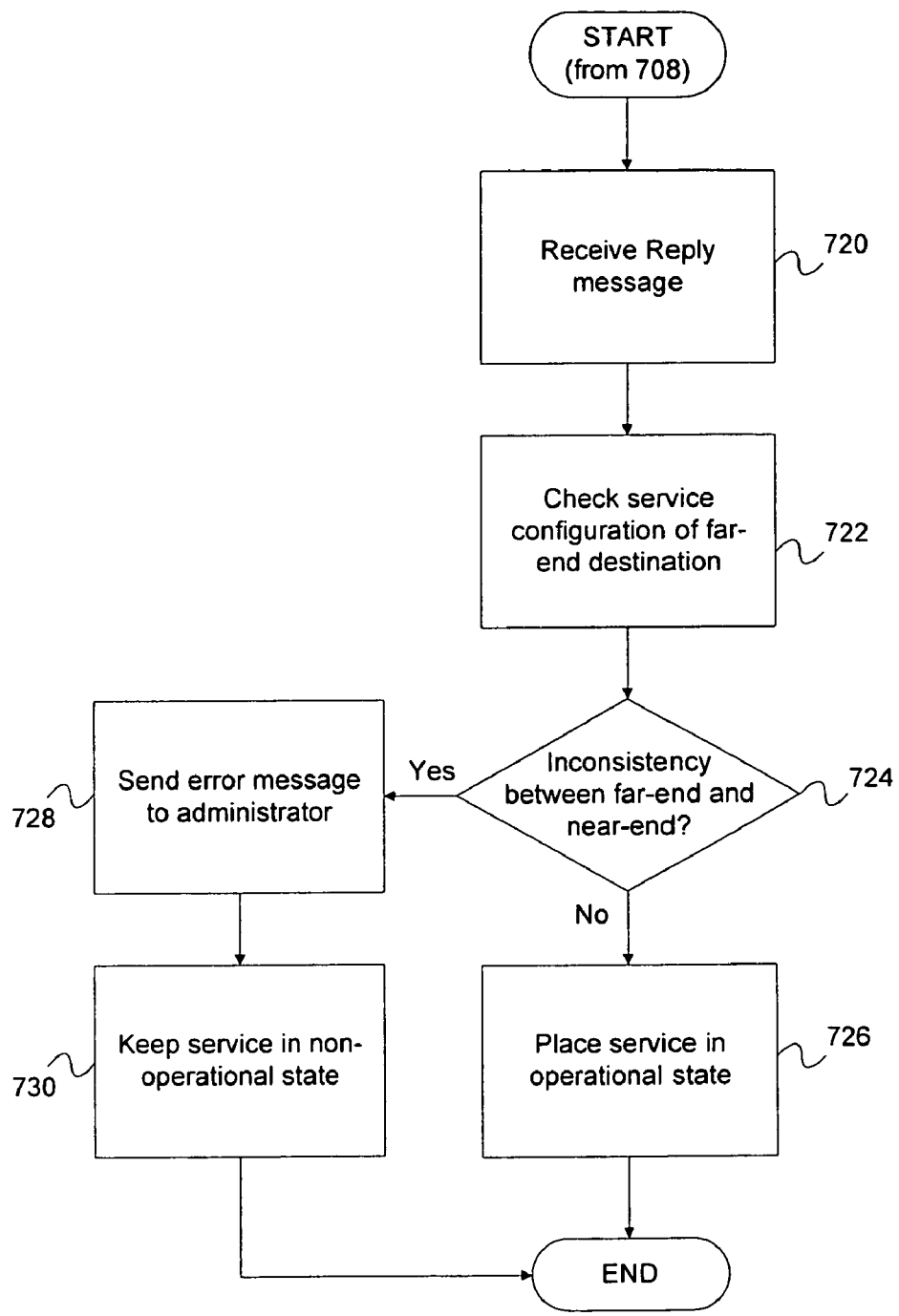
FIG. 7B illustrates a further process for determining a service configuration, in accordance with an embodiment.

FIG. 7B illustrates a process for determining a service configuration, in accordance with an embodiment. In one embodiment, the process of FIG. 7B is used to implement step 708 of the process shown in FIG. 7A. A reply message (e.g., echo request reply message for OAM functions, etc.) is received (720). The reply message is checked to determine the service configuration of the far-end destination (e.g., SER) (722). It is determined whether there is an inconsistency between the far-end ESR and near-end SER, in terms of service configuration (724).

If an inconsistency between the far-end ESR service configuration and the near-end ESR service configuration is not found, then the service is placed into an operational state (726). If an inconsistency between the far-end ESR service configuration and the near-end ESR service configuration is found, then an error message is sent to the network/system administrator (728) and the service is kept in a non-operational state (730).

Figure 8:
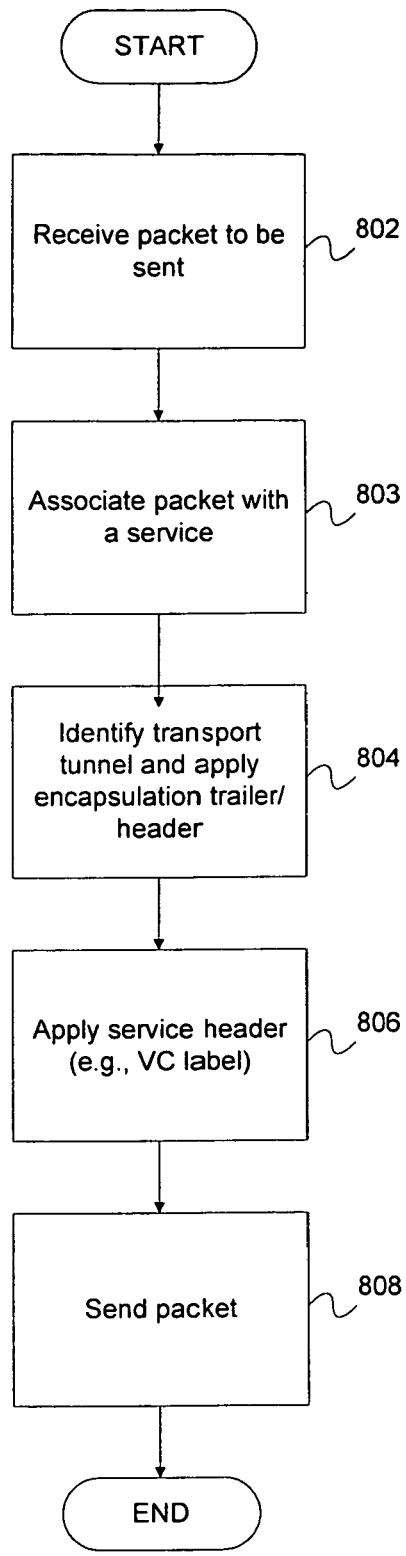
FIG. 8 illustrates a process for service packet handling using a service-based distribution path, in accordance with an embodiment.

FIG. 8 illustrates a process for service packet handling using a service-based distribution point, in accordance with an embodiment. A packet to be sent to a far-end destination such as an ESR or end service (e.g., VLL Service 123—FIG. 3) is received (802). The received packet is associated with a service (803). In one embodiment, the packet is associated with a service based on information supplied by and/or associated with a service access point from which the packet was received. The transport tunnel (e.g., LSP) that will be used to transport the packet is determined and the packet is encapsulated as required for transport. The encapsulation may include a media and encapsulation dependent header (e.g., DLC header) and/or a trailer, depending upon the media and encapsulation method used, as described above in connection with FIGS. 4 and 5. In one embodiment, the service may be mapped to a particular transport tunnel (e.g., an LSP) or a tunnel associated with the SDP may be selected based on such considerations as load sharing, an exchange of data with which the packet is associated (e.g., a session or "conversation" between two nodes), and/or the destination address (e.g., destination MAC address) of the packet. A service header that may include a VC label to identify the packet as being associated with a particular service is applied (806). Martini encapsulation or other encapsulation techniques may be used to add the service header. The packet is forwarded to the far-end ESR via the tunnel identified in step 804 (808). At the destination (egress) SER, the service header is used to identify how the packet should be handled. In one embodiment, as described above in connection with FIG. 3, the egress ESR associates the packet with a service, e.g., based on a VC label associated with the service, and forwards the packet to a service access point associated with the service for further processing and delivery.

Figure 9:
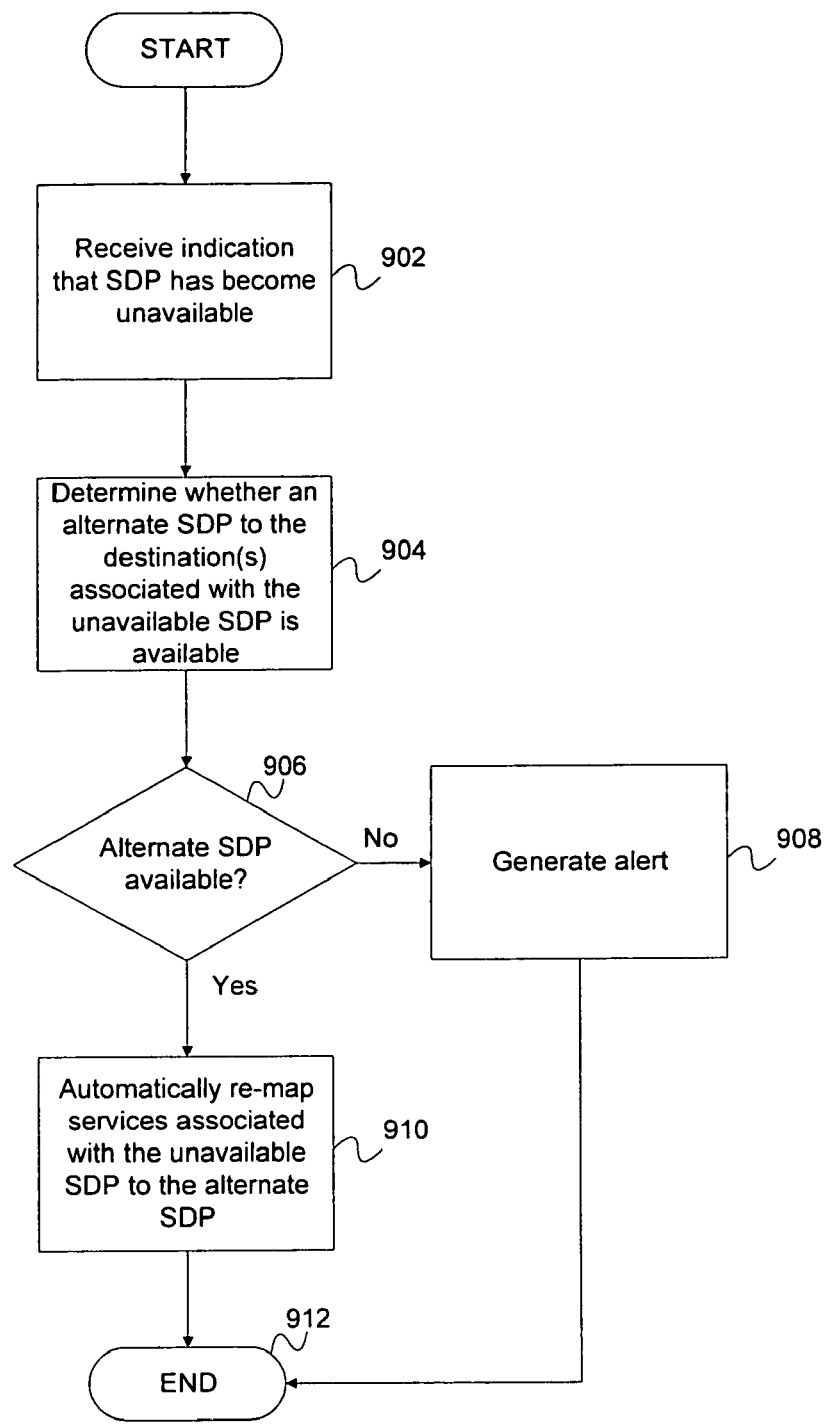
FIG. 9 illustrates a process used in an embodiment to automatically remap a service to an alternate SDP in the event an SDP becomes unavailable.

The use of a service-based distribution point as described herein facilitates rapid recovery from tunnel failures due to the ability to quickly remap services to alternate SDPs and/or transport tunnels. FIG. 9 illustrates a process used in an embodiment to automatically remap a service to an alternate SDP in the event an SDP becomes unavailable. An indication is received that an SDP has become unavailable (902). In one embodiment, the indication received in step 902 is generated as a result of a continuing or periodic process of verifying the tunnel and/or service connectivity and configuration, using a process such as described above in connection with FIGS. 7A and 7B. It is determined whether an alternate SDP to the destination(s) associated with the SDP that has become unavailable is available (904). If it is determined that an alternate SDP is not available (906), an alert is generated (908) and the process ends (912). If it is determined that an alternate SDP is available (906), the service(s) associated with the SDP that has become unavailable are remapped automatically to the alternate SDP (910), after which the process of FIG. 9 ends (912). A process similar to that shown in FIG. 9 may be used within an SDP to remap a service, e.g., a VLL service, to an alternate transport tunnel (e.g., LSP) in the event of failure of a transport tunnel to which the SDP has bound a particular service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for transporting data through a network including:
associating a transport tunnel with a service distribution point configured to transport data to a destination provider edge router associated with the network, wherein the service distribution point comprises one or more transport tunnels based on one or more transport protocol;
mapping a service to the service distribution point but not directly to the transport tunnel;
using the transport tunnel to transport data associated with the service to the destination provider edge router; and
wherein the service is mapped to the service distribution point selected from a plurality of service distribution points associated within a single router by a service distribution point mapping module configured to map each of one or more services to a corresponding one or more service distribution points, where each of the plurality of service distribution points comprises a distribution point for a single destination router; and wherein the service distribution point is configured to monitor an operation state of the transport tunnel and automatically route traffic associate with the service to an alternate transport tunnel if the transport tunnel is non-operational.

2. A method as recited in claim 1 further comprising performing an operational determination of the service and the transport tunnel.

3. A method as recited in claim 2 wherein performing an operational determination further includes verifying the transport tunnel.

4. A method as recited in claim 2 wherein performing an operational determination further includes sending a message to an endpoint.

5. A method as recited in claim 2 wherein performing an operational determination further includes receiving a reply message in response to a message sent to an endpoint.

6. A method as recited in claim 2 wherein performing an operational determination further includes verifying that the service is properly configured at a far end destination associated with the service distribution point.

7. A method as recited in claim 1 wherein the transport tunnel comprises a label switched path (LSP).

8. A method as recited in claim 1 wherein the service distribution point comprises a first service distribution point associated with a far end destination and the method further includes:
   receiving an indication that the first service distribution point has become unavailable; and
   automatically re-mapping the service to a second service distribution point associated with the far end destination.

9. A method as recited in claim 8 further including determining whether the second service distribution point associated with the first far end destination is available.

10. A method as recited in claim 1 wherein using the transport tunnel to transport data associated with the service includes:
    receiving a packet associated with the service;
    encapsulating the packet with a service header; and
    forwarding the packet via the transport tunnel to a far end destination associated with the service distribution point.

11. A method as recited in claim 10 wherein the service header comprises an identifier associated with the service.

12. A method as recited in claim 11 wherein the identifier associated with the service comprises a virtual circuit label associated with the service.

13. A method as recited in claim 1 wherein the service header is used at the far end destination to associate the packet with the service.

14. A method as recited in claim 1 wherein the network comprises a combination of two or more component networks.

15. A method as recited in claim 1 wherein the network comprises an Internet protocol (IP) network.

16. A method as recited in claim 15 wherein the transport tunnel comprises an IP/GRE tunnel.

17. A method as recited in claim 1 wherein the network comprises an MPLS network.

18. A method as recited in claim 17 wherein the transport tunnel comprises a label switched path (LSP).

19. A method as recited in claim 1 wherein the transport tunnel comprises a first transport tunnel and the method further includes associating one or more additional transport tunnels with the service distribution point.

20. A method as recited in claim 19 further including implementing load sharing among the transport tunnels associated with the service distribution point.

21. A method as recited in claim 20 further including mapping the service to a selected one of the transport tunnels associated with the service distribution point.

22. A method as recited in claim 1 wherein the service comprises a first service and the method further comprises mapping one or more additional services to the service distribution point.

23. A method as recited in claim 1 wherein the service distribution point comprises a first service distribution point, the transport tunnel comprises a first transport tunnel, the service comprises a first service, and the method further includes:
    associating a second transport tunnel with a second service distribution point;
    mapping a second service to the second service distribution point; and
    using the second transport tunnel to transport data associated with the service.

24. A method as recited in claim 1 wherein the service distribution point comprises one of a plurality of service distribution points, the transport tunnel comprises one of a plurality of transport tunnels, the service comprises one of a plurality of services, and the method further includes:
    associating each of said plurality of transport tunnels with one of said plurality of service distribution points;
    mapping each of said plurality of services to one or more of said plurality of service distribution points; and
    transporting data associated with each of said plurality of services using a transport tunnel associated with a service distribution point to which the service has been mapped.

25. A data transport system including:
    an input interface configured to receive a packet associated with a service; and
    a processor configured to associate a transport tunnel with a service distribution point configured to transport data to a destination provider edge router associated with the network, to map a service to the service distribution point but not directly to the transport tunnel, and use the transport tunnel to transport data associated with the service to the destination provider edge router network, wherein the service distribution point comprises one or more transport tunnels based on one or more transport protocol;
    wherein the service is mapped to the service distribution point selected from a plurality of service distribution points associated within a single router by a service distribution point mapping module configured to map each of one or more services to a corresponding one or more service distribution points, where each of the plurality of service distribution points comprises a distribution point for a single destination router; and
    wherein the service distribution point is configured to monitor an operation state of the transport tunnel and automatically route traffic associated with the service to an alternate transport tunnel if the transport tunnel is non-operational.

26. A data transport system as recited in claim 25 wherein the processor is further configured to encapsulate said data associated with the service using a service header that includes an identifier associated with the service.

27. A data transport system as recited in claim 25 wherein the identifier comprises a virtual circuit label.

28. A data transport system as recited in claim 25 wherein the data transport system comprises a router.

29. A computer program product for transporting data through a network, the computer program being embodied in a non-transient computer readable storage medium and comprising computer instructions for:
- associating a transport tunnel with a service distribution point configured to transport data to a destination provider edge router associated with the network, wherein the service distribution point comprises one or more transport tunnels based on one or more transport protocol;
- mapping a service to the service distribution point but not directly to the transport tunnel;
- using the transport tunnel to transport data associated with the service to the destination provider edge router; and
- wherein the service is mapped to the service distribution point selected from a plurality of service distribution points associated within a single router by a service distribution point mapping module configured to map each of one or more services to a corresponding one or more service distribution points, where each of the plurality of service distribution points comprises a distribution point for a single destination router; and
- wherein the service distribution point is configured to monitor an operation state of the transport tunnel and automatically route traffic associated with the service to an alternate transport tunnel if the transport tunnel is non-operational.

* * * * *